United States Patent
Suzuki et al.

(10) Patent No.: US 8,011,006 B2
(45) Date of Patent: Aug. 30, 2011

(54) ACCESS CONTROLLER AND ACCESS CONTROL METHOD

(75) Inventors: Takashi Suzuki, Yokohama (JP); Akira Kinno, Yokohama (JP); Hiroshi Fujimoto, Yokohama (JP); Takehiro Nakayama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1084 days.

(21) Appl. No.: 11/372,084

(22) Filed: Mar. 10, 2006

(65) Prior Publication Data

US 2006/0206899 A1 Sep. 14, 2006

(30) Foreign Application Priority Data

Mar. 14, 2005 (JP) ................. P2005-071823

(51) Int. Cl.
  *G06F 21/00* (2006.01)
  *G06F 21/02* (2006.01)
  *G06F 12/00* (2006.01)
  *G06F 12/14* (2006.01)

(52) U.S. Cl. .......... 726/16; 726/2; 726/17; 726/27; 726/26; 713/164; 713/165; 710/107; 710/100; 710/33; 710/1; 711/147; 711/100; 709/212

(58) Field of Classification Search .......... None
See application file for complete search history.

(56) References Cited

U.S. PATENT DOCUMENTS

| | | | |
|---|---|---|---|
| 5,335,334 A * | 8/1994 | Takahashi et al. | 711/164 |
| 5,355,334 A * | 10/1994 | Koga et al. | 365/189.04 |
| 6,308,317 B1 * | 10/2001 | Wilkinson et al. | 717/139 |
| 6,584,508 B1 * | 6/2003 | Epstein et al. | 709/229 |
| 6,745,306 B1 * | 6/2004 | Willman et al. | 711/163 |
| 7,020,772 B2 * | 3/2006 | England et al. | 713/166 |
| 7,191,469 B2 * | 3/2007 | Erlingsson | 726/27 |
| 7,275,028 B2 * | 9/2007 | Traut | 703/23 |
| 7,426,644 B1 * | 9/2008 | Strongin et al. | 713/193 |
| 7,490,072 B1 * | 2/2009 | Cowan et al. | 706/47 |
| 7,543,335 B2 * | 6/2009 | England et al. | 726/27 |
| 7,673,138 B2 * | 3/2010 | Hosokawa et al. | 713/164 |
| 7,788,699 B2 * | 8/2010 | Largman et al. | 726/1 |
| 7,849,360 B2 * | 12/2010 | Largman et al. | 714/13 |
| 7,853,947 B2 * | 12/2010 | Laborczfalvi et al. | 718/1 |
| 2004/0006706 A1 * | 1/2004 | Erlingsson | 713/200 |

FOREIGN PATENT DOCUMENTS

JP 9-311821 12/1997

OTHER PUBLICATIONS

"Ostia: a delegating architecture for secure system call interposition", Feb. 5, 2006, Stanford Univ. Dept of Computer Science.*

(Continued)

*Primary Examiner* — Syed Zia

(74) *Attorney, Agent, or Firm* — Oblon, Spivak, McClelland, Maier & Neustadt, L.L.P.

(57) ABSTRACT

An access controller controls access to control target resources by a program. The access controller includes a function access detection unit and a resource access control unit. The function access detection unit detects loading of a control target function from the program and generates identification information to specify an access request issued from the detected control target function. The resource access control unit obtains a request of accessing the control target resources from the program and determines permission of the access request based on the identification information.

11 Claims, 7 Drawing Sheets

OTHER PUBLICATIONS

Crispin Cowan, et al., "SubDomainlm™: Parsimonious Server Security", 2000 WireX Communications, Inc., pp. 1-20.

Albert Serra, et al., "DITools: Application-level Support for Dynamic Extension and Flexible Composition", Proceedings of 2000 Usenix Annual Technical Conference, 2000, 14 pages.

Terrence Mitchem, "Using Kernel Hypervisors to Secure Applications", Proceedings of the Annual Computer Security Application Conference, 1997, pp. 175-181.

Office Action issued Aug. 17, 2010 in JP Application No. 2005-071823 (With English Translation).

* cited by examiner

FIG.3

| RESOURCE | ACCESS REQUEST ORIGIN | IDENTIFICATION INFORMATION | PERMITTED OPERATION |
|---|---|---|---|
| type_a | domain_1 (pre-install) | — | loct1 read write create ... |
| type_b | domain_2 (download) | NO | loct1 read write create ... |
| | | YES | |

ACCESS CONTROLLER AND ACCESS CONTROL METHOD

CROSS REFERENCE TO RELATED APPLICATIONS

This application is based upon and claims the benefit of priority from prior Japanese Patent Application P2005-71823 filed on Mar. 14, 2005; the entire contents of which are incorporated by reference herein.

BACKGROUND OF THE INVENTION

1. Field of the Invention

The present invention relates to an access controller and an access control method for controlling access to control target resources by a program.

2. Description of the Related Art

A use form in which a program is obtained through a network and executed by a personal computer, a PDA, or a portable telephone has been popular. Such a use form is advantageous in that a necessary application is quickly obtained to improve convenience for a user. Regarding program codes distributed through the network, however, there are ill-intentioned codes designed to destroy a system or perform an illegal operation, and defective codes which cause abuse or operation damages of system resources. An increase in use of downloaded applications has brought about an urgent need to secure user convenience and safety of program execution. Hence, a mechanism of preventing damages by ill-intentioned or defective codes (illegal codes) has become more important.

As the mechanism of preventing damages by illegal codes, there is available an execution environment of a program code called a sandbox which limits access to resources. The sandbox includes an access control function of controlling access to a file from a program code (sandboxed code) executed in the sandbox, the network, or the like according to an access rule called a security policy. In this case, to secure safety by the sandbox, it is necessary to prevent the sandboxed code from bypassing access control processing to directly access the resources.

As an effective method of preventing bypassing of access control, a sandbox that uses a system call hook is available. The system call is a request issued to an operating system (OS) when the program code accesses resources such as a file or a network. It is difficult to operate computer resources without a system call. Thus, by adding access control processing by way of a system call (referred to as "hook" hereinafter), bypassing is made difficult (e.g., see Using Kernel Hypervisors to Secure Applications, in Proceedings of the Annual Computer Security Application Conference, 1997).

However, the system call is a low-level interface of the OS, and it is difficult to obtain program meaning information from information of the system call hooked by the OS. Accordingly, in the access control based on the system call hook, there is a difficulty of controlling/processing which takes the program meaning information into consideration. When the program meaning information cannot be obtained, profound knowledge, and time and labor regarding the system are necessary. Besides, description of flexible access rules based on the program meaning information such as conditional permission, "program installation is permitted under condition of obtaining a backup or history", at a system call level is difficult.

The problem caused by the impossibility of obtaining the meaning information can be solved by a sandbox which uses a library function loading hook. There is available a realization method of replacing a library containing a control target function by a library containing hook processing in the sandbox (e.g., DITools: Application-Level Support for Dynamic Extension and Flexible Composition, in Proceedings of 2000 USENIX Annual Technical Conference, 2000). Thus, access control processing can be added according to an interface of high abstraction, and various access rules based on meaning information can be efficiently set.

However, in the case of the sandbox dependent on the library function loading hook alone, it is impossible to prevent a bypass attack of directly issuing a system call, ant thus there is a serious problem in safety.

The present invention has been made with the foregoing problems in mind, and objects of the invention are to provide an access controller and an access control method for achieving both of high-level resource access control based on program meaning information and strong safety to prevent bypassing.

SUMMARY OF THE INVENTION

A first aspect of the present invention is to provide an access controller for controlling access to control target resources by a program, including: (A) a function access detection unit which detects loading of a control target function from the program and generates identification information to specify an access request issued from the detected control target function; and, (B) a resource access control unit which obtains a request of accessing the control target resources from the program and determines permission of the access request based on the identification information.

A second aspect of the present invention is to provide an access control method for controlling access to control target resources by a program, including: (A) detecting loading of a control target function from the program; (B) generating identification information to specify an access request from the detected control target function; (C) obtaining a request of accessing the control target resources from the program; and, (D) determining permission of the access request based on the identification information.

BRIEF DESCRIPTION OF THE DRAWINGS

FIG. 3 is a diagram showing an example of resource access control rules according to the embodiment.

DETAILED DESCRIPTION OF THE INVENTION

Figure 1:
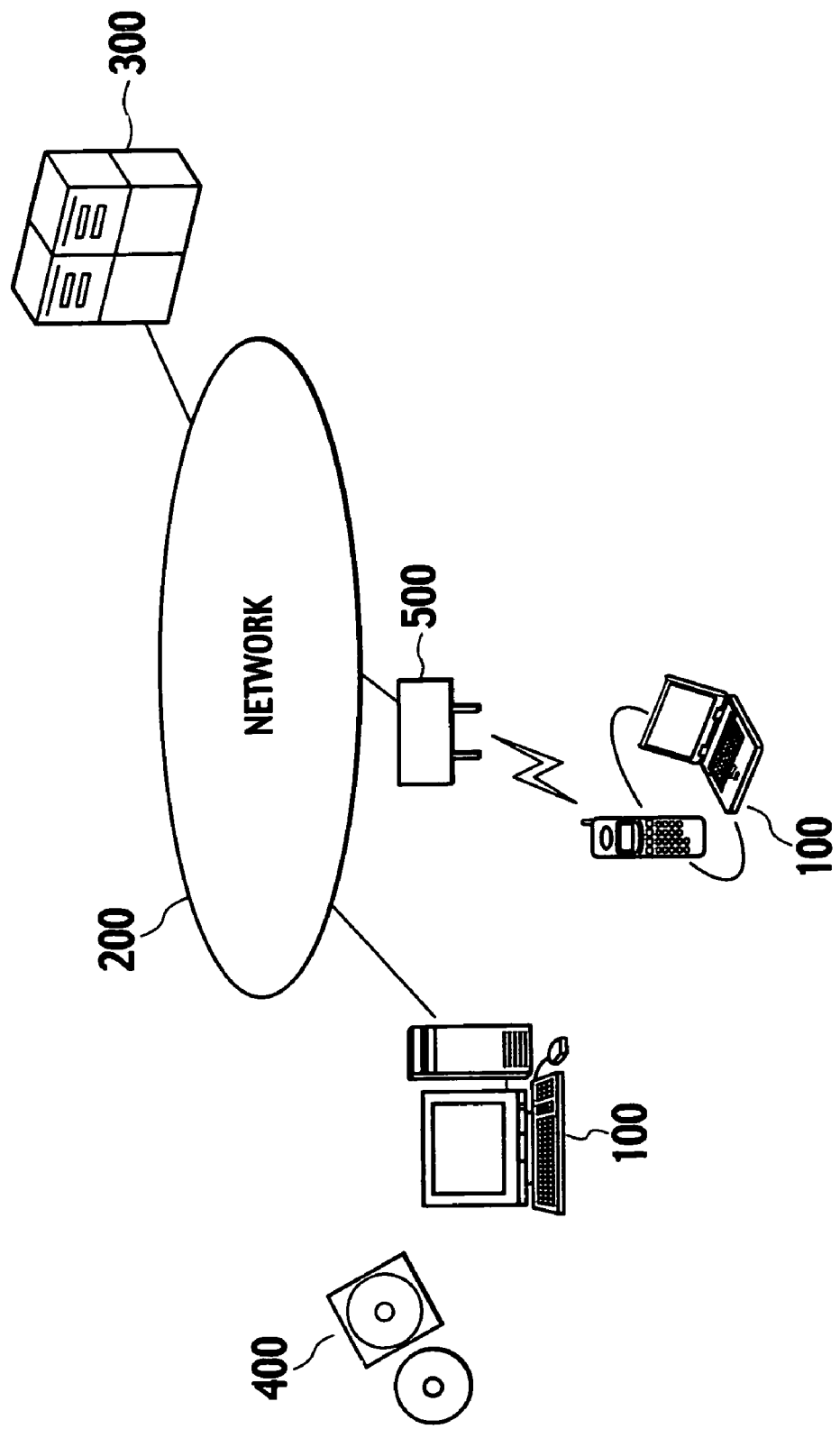
FIG. 1 is a diagram showing a system which uses an access controller of an embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Access Controller)

FIG. 1 shows a configuration of a system which distributes and executes application programs according to an embodiment of the present invention. According to the system, a computer 100 such as a personal computer, a PDA or a portable telephone executes various programs of a Web browser, a mail client, a game, and the like. The programs executed by the computer 100 include a program installed at the time of shipping the computer 100, a program copied from a recording medium 400 such as a CD-ROM or a DVD-ROM, a program downloaded from an application download server 300 through a network 200 or a base station 500, and the like, and they are different in reliability and quality.

Figure 2:
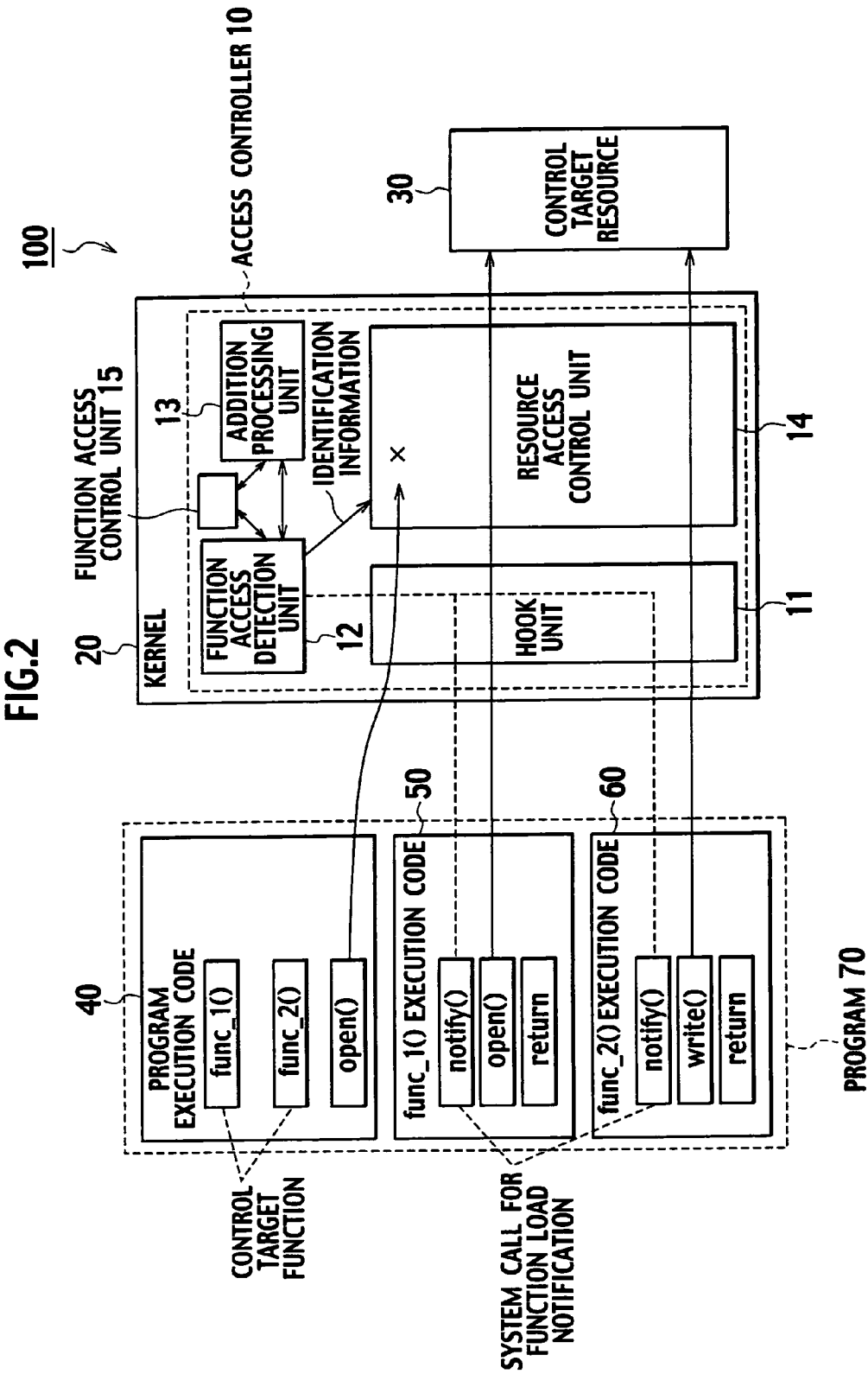
FIG. 2 is a block diagram showing a configuration of the access controller of the embodiment.

As shown in FIG. 2, the computer 100 of the embodiment includes an access controller 10 to protect control target resources 30 such as user data, a system file or a network from illegal programs. Specifically, the access controller 10 controls access to the control target resources 30 by each system call (e.g., open( ), write( )).

The access controller 10 includes a hook unit 11 for obtaining a system call issued from a program 70 to a kernel 20 to transfer it to a function access detection unit 12 and a resource control unit 14 which have been preset, the function access detection unit 12 for detecting loading from the program 70 to a control target function and generating identification information to specify that the loading is an access request issued from the detected control target function, a function access control unit 15 for obtaining information of a loading origin process of the control target function and determining permission of loading of the control target function based on function permission access control rules, the resource access control unit 14 for obtaining a request of accessing the control target resources 30 from the program 70 to determine permission of the access request based on the identification information, and an addition processing unit 13 for executing predefined processing when the function access detection unit 12 permits loading of the control target function.

In FIG. 2, a program execution code 40 contains a plurality of function loads, and func_1( ), and func_2( ) are set as control target functions. At a start of each of a func_1( ) execution code 50 and a func_2( ) execution code 60, there is nofity( ) which is a notification command (referred to as "system call for function load notification" hereinafter) for notifying function loading to the access controller 10 (kernel 20). Upon transfer to processing of the control target functions (func_1( ), and func_2), nofity( ) is issued.

In an argument of the system call notify( ), identification information such as a control target function name necessary when the kernel 20 specifies a system call issued from a control target function, or related information for generating the identification information is set. For example, a memory stored address of a function execution code, a temporary address for calculating the stored address, information loaded on a stack, or the like can be used as identification information. The identification information will be described in detail below.

Next, each processing unit of the access controller 10 will be described in detail.

The hook unit 11 obtains a system call notify( ) for function load notification to transfer it to the function access detection unit 12. The hook unit 11 transfers a system call to request access to the control target resources 30 to the resource access control unit 14.

The function access detection unit 12 detects loading of a control target function from the program 70, and generates identification information to specify that the loading is a system call issued from the detected control target function.

For example, the function access detection unit 12 obtains a control target function name and information regarding a control target function loading origin process (e.g., program execution code 40) to determine permission of loading of the control target function based on function permission access control rules. The "access permission access control rules" write whether a function is a control target function permitted to be loaded or not.

The function access detection unit 12 verifies whether the system call notify( ) for function load notification has been illegally made or not before the determination of the permission of loading, and the processing can be continued only upon confirmation that the system call noify( ) has been issued from the control target function. A specific confirmation method will be described in detail below.

The function access control unit 15 obtains the control target function name and the information regarding the control target function loading origin process to determine permission of the control target function loading based on the function permission access control rules. Then, when the function detection unit 12 generates identification information when the loading is permitted.

The addition processing unit 13 executes predefined processing when the function access control unit 15 permits loading of a control target function. In the "function permission access control rules", a conditional permission rule for permitting function loading under a condition of specific processing may be described. In the of conditional permission, the function access detection unit 12 transfers processing to the addition processing unit 13 to execute processing described as a condition.

As processing set as conditions, for example, there are recording (logging) of access history to resources which accompanies function loading, backup obtaining of the control target resources 30, and the like.

The additional processing unit 13 executes the predefined processing, and the function access control unit 15 may permit loading of the control target function upon the execution of the predefined processing by the addition processing unit.

When the function loading is permitted, the function access detection unit 12 generates identification information necessary when system call issuance from the function is detected by using one or both of information on a system call argument for function load notification and information obtained from the kernel 20.

The resource access control unit 14 obtains a request of accessing the control target resources 30 from the program 70, and determines permission of access of a system call based on the identification information generated by the function access detection unit 12 and resource permission access control rules. As shown in FIG. 3, in the "resource access control rules", rules constituted of a group of permitted operations including information of the control target resources 30, information of the program of an access request origin, and the identification information generated by the function access detection unit 12 are described. Rules to be controlled include access permission of a predetermined control target function alone to the predetermined control target resources 30, rejection of a predetermined control target function alone by the predetermined control target resources 30. For example, in the resource access control rules, a rule which unconditionally permits a system call from a program installed from the time of shipping the computer 100 but permits a system call only specified by identification information for a downloaded program can be described. In this case, for the downloaded program, the resource access control unit 14 permits access to the control target resources 30 only by way of a loading-permitted function.

(Access Control Method)

Next, referring to FIG. 4, an access control method of an embodiment will be described.

Figure 5:
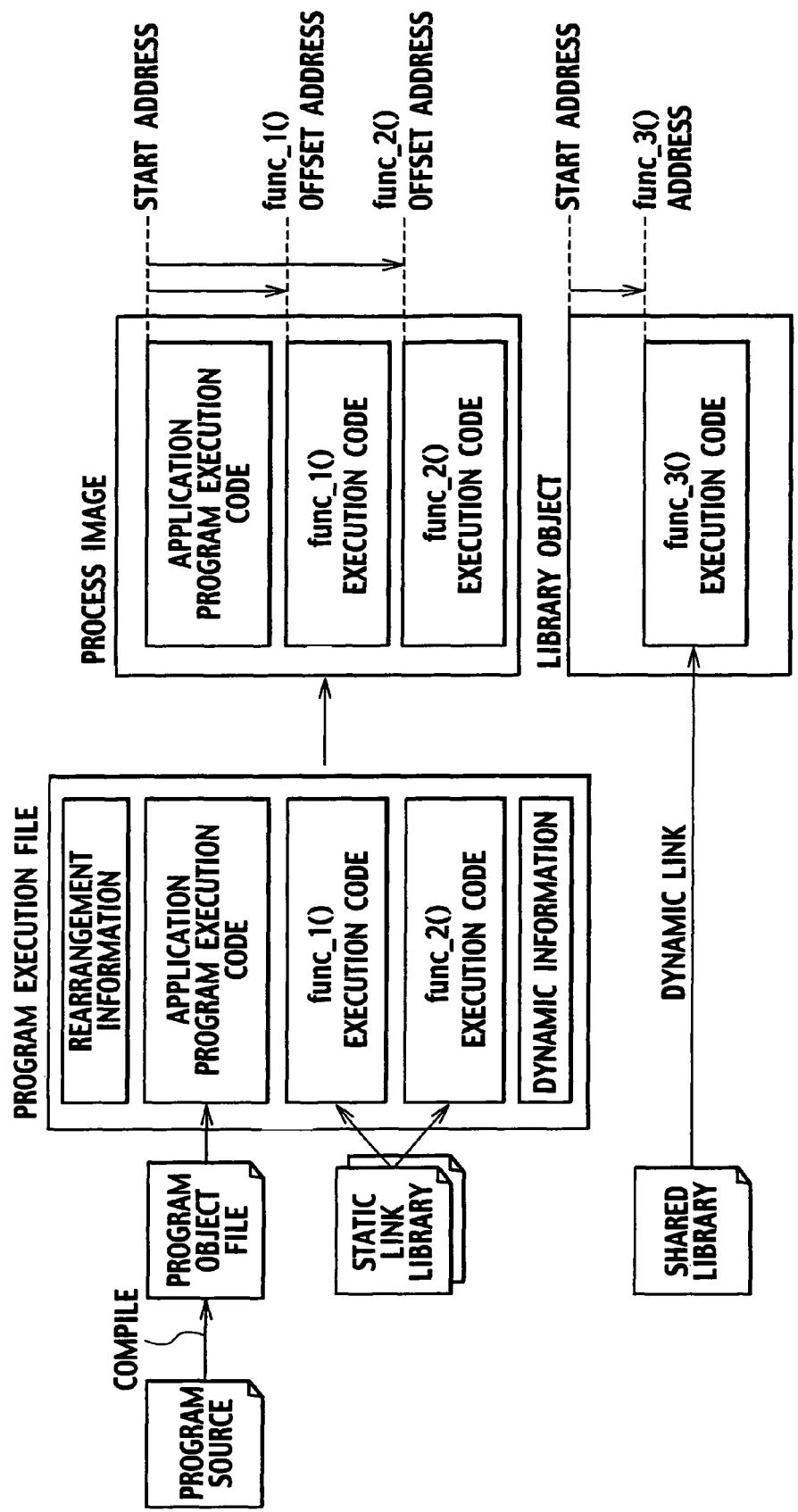
FIG. 5 is a diagram showing a loaded state of a program according to the embodiment.

First, as shown in FIG. 5, it is presumed that a program object file has been generated by compiling program sources, and an application program execution code has been arranged in a program execution file. By linking with a static link library, execution codes of func_1( ) and func_2( ) which are control target functions of the embodiment are arranged in the program execution file. Additionally, rearrangement information indicating arrangement information of each execution code, dynamic information for dynamically linking a shared library, and the like are arranged in the program execution file. By loading these, the application program execution code, the func_1( ) execution code, and the func_2( ) execution code are arranged in real memory addresses. By linking with the shared library, a func_3( ) execution code that is a library object may be arranged.

Figure 4:
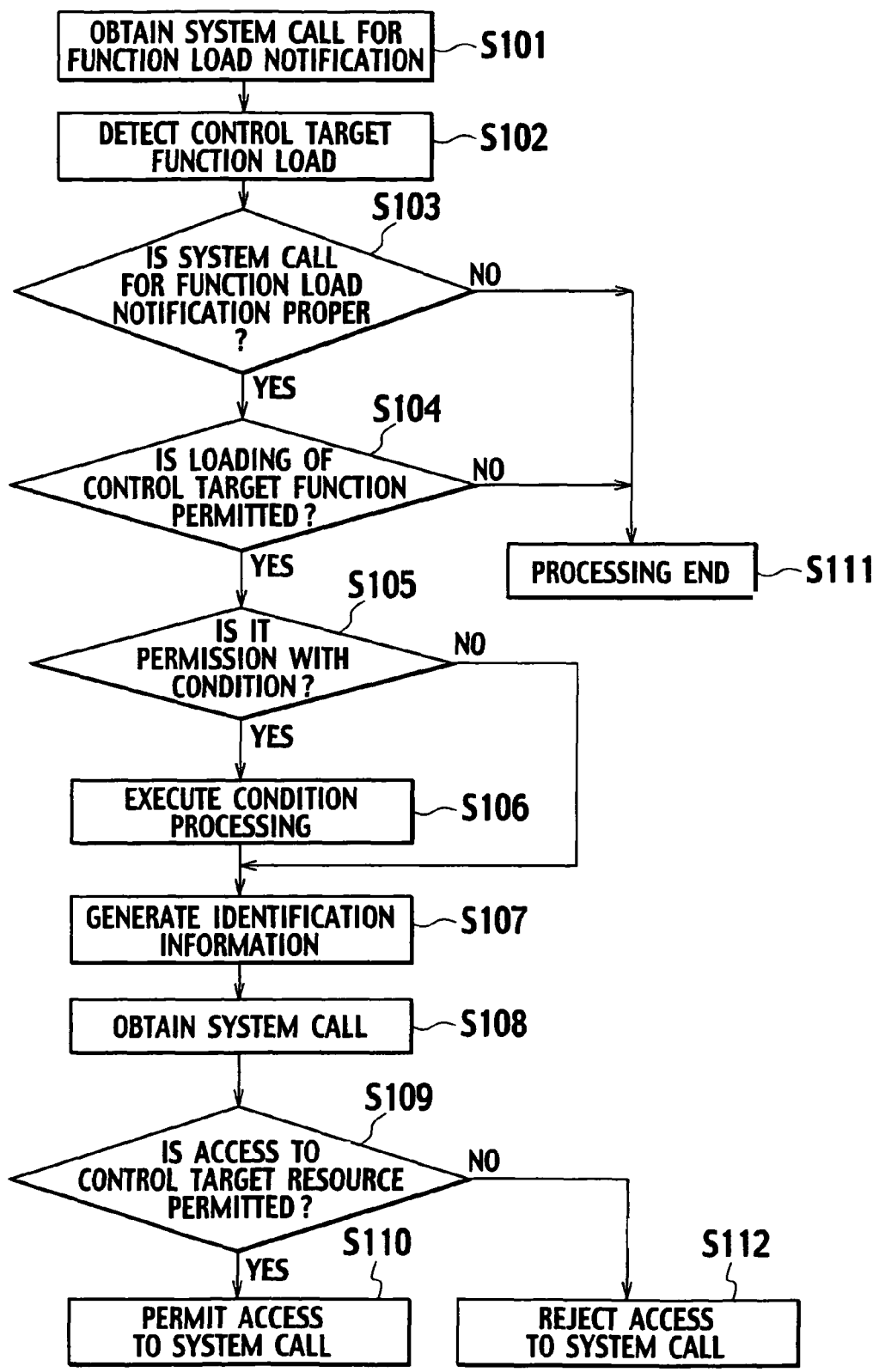
FIG. 4 is a flowchart showing an access control method according to an embodiment.

In step S101 of FIG. 4, the hook unit 11 obtains a notification command (e.g., system call notify( ) for function load notification) set to notify loading of a control target function. Then, the hook unit 11 transfers the notification command to the function access detection unit 12.

And, in step S102, the function access detection unit 12 detects loading of a control target function from a program.

Next, in step S103, the function access detection unit 12 verifies whether the system call notify( ) for function load notification has been illegally made or not. For example, a memory address of a system call notify( ) issuance origin is obtained by referring to a program counter or the like, and confirmation can be made by verifying whether the memory address is within a stored address range of a control target function specified from a system call function. For example, as shown in FIG. 5, for the stored address of the control target function, a func_1( ) offset address and a func_2( ) offset address can be calculated by describing offset to a function object in a header area of the program execution code and adding offset to a program arrangement destination address.

Figure 6:
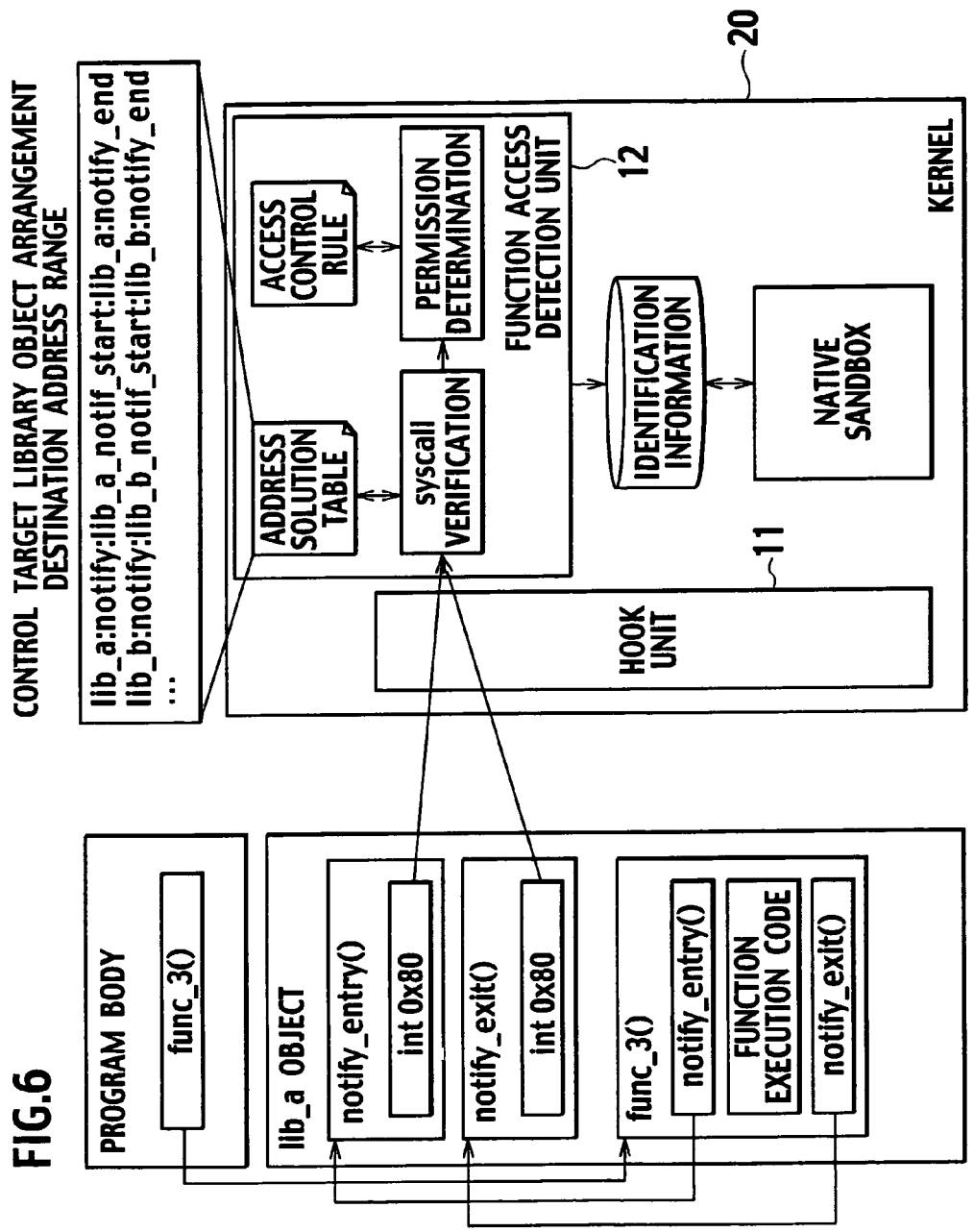
FIG. 6 is a diagram showing verification of an issuance origin of a system call for function load notification.

When a control target function (func_3( )) is contained in the shared library, through a procedure shown in FIG. 6, an issuance origin of a notify system call can be verified. It is presumed that an issuance function of a notify system call is contained in a library, and the notify system call issuance function in the library is loaded from the control target function. The function access detection unit 12 manages an address solution table indicating an address range where the shared library has been arranged, and can determine whether the issuance origin address of the notify system call is within the address range or not.

If the system call notify( ) for function load notification is proper, the process proceeds to step S104. If not proper, the process proceeds to step S111. Error processing indicating that the system call notify( ) for function load notification is not proper is executed to finish the process.

Next, in step S104, the function access detection unit 12 obtains information of a control target function name and a control target function load origin process (e.g., program execution code 40) from an argument of the system call notify( ), and determines permission of loading of the control target function based on function permission access control rules. If the loading is permitted, the process proceeds to step S105. If not permitted, the process proceeds to step S11. Error processing showing a message of no authority to load the control target function or the like is executed to finish the process.

Next, in step S105, the function access detection unit 12 determines whether a conditional rule for permitting function loading under a specific processing condition has been described or not in the function permission access control rules. In the case of conditional permission, the process proceeds to step S106. In the case of no conditional permission, the process proceeds to step S107.

Then, in step S106, the addition processing unit 13 executes processing described as a condition.

Subsequently, in step S107, the function access detection unit 12 generates identification information to specify an issued system call from the detected control target function.

Figure 7:
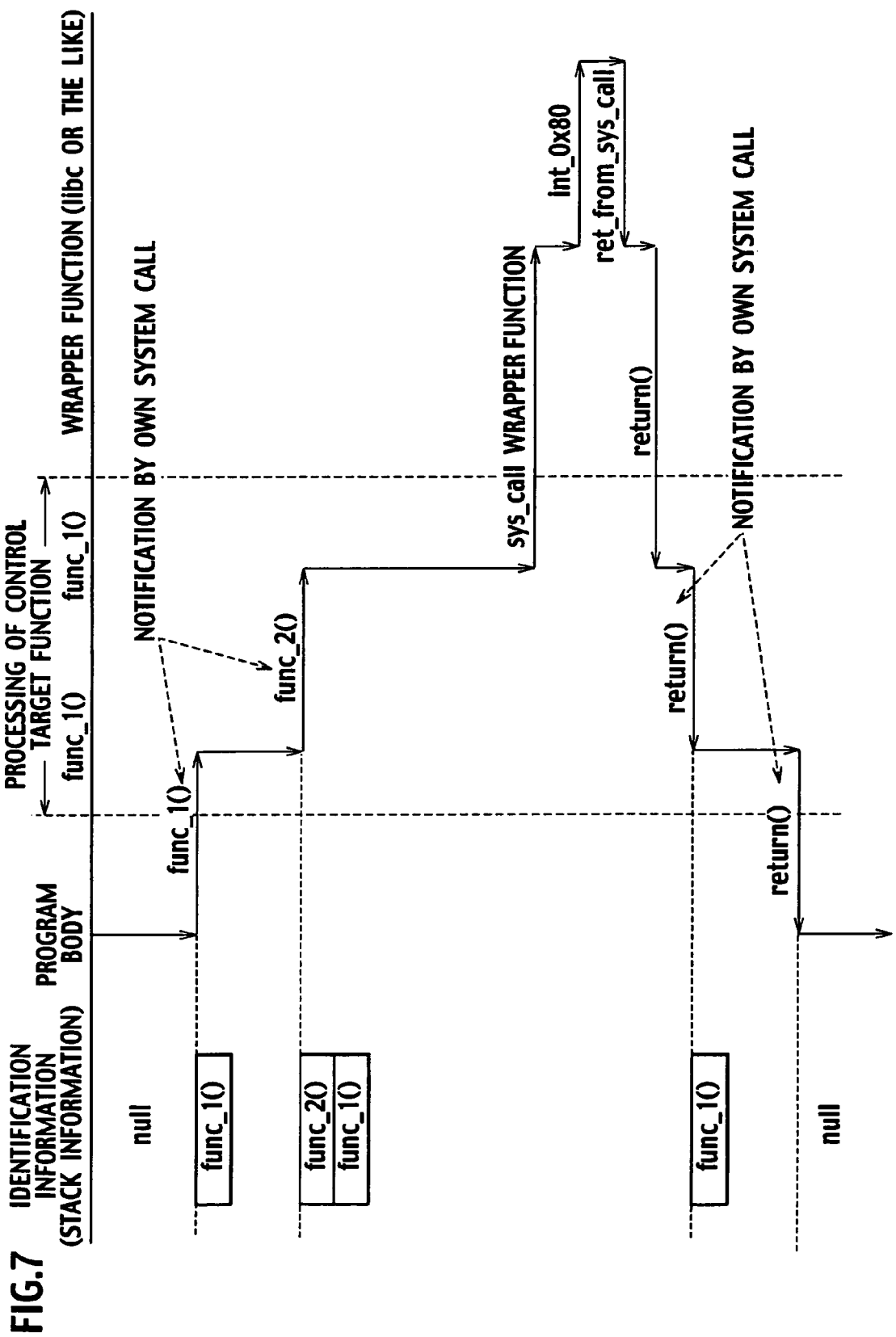
FIG. 7 is a diagram showing stack information of the access controller of the embodiment.

For example, the function access detection unit 12 loads a function name of a control target function on a stack when the control target function is loaded, removes the function name of the control target function from the stack when the process returns to a control target function load origin process, and generates information stored in the stack as identification information. Specifically, as shown in FIG. 7, the identification information can be created through a procedure of loading function names (func_1( ) and func_2( )) upon reception of a system call (notify1( )) for function load notification whose argument contains function names of control target functions on stack information, and removing the functions names (func_1( ) and func_2( )) upon reception of a system call (notify2( )) for function return notification.

The function access detection unit 12 may load the control target function name obtained from a notification command only when a code memory address is within a stored range of a function object file during program execution at the time of obtaining the notification command.

The function access detection unit 12 may calculate a stored address range of a real memory of the execution code of the control target function to generate it as identification information. Specifically, as shown in FIG. 4, when an address offset and a size of a function execution code are set in the argument of the system call for function load notification, a loaded real memory address of the program execution code is obtained, and the offset and the size are added thereto to calculate a stored address range of the real memory of the function execution code. Then, the calculated stored address range is generated as identification information. A memory address may be directly contained in the argument of the system call for function load notification.

A temporary memory address range of the execution code of the control target function may be contained in the argument of the system call for function load notification. In this case, the function access detection unit 12 obtains a real memory address range in which the execution code is arranged from the temporary memory address range to generate it as identification information. As a method of obtaining the real memory address range, for example, presuming that the temporary memory address range is an address offset of a last execution code of a control target function from the execution code of the system call for function load notification, the function access detection unit 12 can obtain a real memory address range by adding the address offset to the memory address of the code being executed upon reception of the system call for function load notification.

The stack information and the address range may be combined together to generate identification information. For example, identification information can be created by correlating function information loaded on the stack with the address range of the function execution code.

Next, in step S108, the hook unit 11 obtains a system call (e.g., open( ) or write( )), and refers to a system call argument to detect a request of accessing the control target resources 30.

Then, the hook unit 11 transfers the request of accessing the control target resources 30 to the resource access control unit 14.

Next, in step S109, the resource access control unit 14 determines permission of access of the system call based on the identification information generated by the function access detection unit 12. If permitted, the process proceeds to step S110 to permit access to the control target resources 30. On the other hand, if not permitted, proceeding to step S112, error processing indicating no authority to access the resource or the like is executed to reject access to the control target resources 30. In FIG. 2, the system calls open( ) and write( ) contained in the func_1( ) execution code 50 and the func_2( ) execution code 60 are permitted to access the control target resources 30 by the resource access control unit 14. However, access of the system call open( ) contained in the program execution code 40 is rejected by the resource access control unit 14.

As a method of determining access permission, for example, when information stored in the stack is used as identification information, the resource access control unit 14 determines access permission of a system call based on loading of a function name of a control target function (system call is permitted if loaded).

When a stored address range is used as identification range, the resource access control unit 14 refers to the process program counter to determine access permission of the system call based on whether a stored address of a command code which has issued the system call is within the stored address range or not.

When information combining the stack information with the address range is used as identification information, the resource access control unit 14 verifies loading of the control target function on the stack and containment of the stored address of the command code which has issued the system call within the stored address range of the function execution code, and determines permission of the system call when both conditions are satisfied.

The operations of the hook unit 11, the function access detection unit 12, and the resource access control unit 14 have been described by using the single flowchart. However, it should be noted that the function access detection unit 12 and the resource access control unit 14 can operate as separate modules.

(Operations and Effects)

According to the access controller 10 and the access control method of the embodiment, by generating the identification information to specify the system call issued from the detected control target function, and determining the permission of access to the resources based on the identification information, the control target function load information can be reflected on access control for a low-level resource access request based on the identification information, and high abstraction by access control of a function load unit and high safety by access control of a low-level resource access request unit can both be achieved. Thus, it is possible to efficiently describe various access rules based on program meaning information and to safely execute a multifunctional program.

The function access control unit 15 obtains the function name of the control target function and the information of the control target function load origin process, and determines loading permission of the control target function based on the function permission access control rules. The function access control unit 12 can generate identification information when the loading is permitted. Accordingly, it is possible to reject illegal loading of the control target function.

According to the access controller 10 and the access control method of the embodiment, when the loading of the control target function is permitted, the predefined processing can be executed. Alternatively, when the predefined processing is executed, the loading of the control target function can be permitted. Hence, the control target function loading is hooked to enable insertion of the predefined processing. Thus, high-level access control rules under conditions of processing execution such as backup obtaining or history obtaining can be mounted, and various requirements of applications or a system can be met.

The resource access control unit 14 can determine access permission of the system call based on the resource permission access control rules in addition to the identification information. Accordingly, for access to specific resources, use of a specific function is required. Thus, access to the specific resources can be permitted only through the reliable function, and safety of program execution can be improved.

The function access detection unit 12 can detect loading of the control target function by obtaining the notification command (e.g., notify( )) set to notify the loading of the control target function. Accordingly, the notification command is hooked to detect the loading of the control target function, whereby the identification information contained in the argument of the communication command or the related information to generate the identification information can be obtained, and the function loading detection can be realized by simple processing. Hence, it is possible to reduce processing and installing costs of the access controller and the method.

The function access detection unit 12 can generate identification information upon confirmation that the notification command has been issued from the control target function. Thus, for example, when the program issues a command to falsely notify loading of the control target function for the purpose of illegally accessing the resources, it can be detected. Hence, it is possible to improve the safety of the program execution more.

The function access detection unit 12 can generate information stored in the stack as identification information, and the resource access control unit 14 can determine resource access permission of the system call based on loading of the function name of the control target function on the stack. Accordingly, even when the control target function loads an additional function, as function loading history is contained in the stack information, it is possible to identify resource access executed through the control target function and its subordinate function.

The notification command contains a control function name, and the function access detection unit 12 can load the function name obtained from the notification command on the stack. Thus, by hooking the notification command, the control target function loading can be detected to obtain the function name, and the function loading detection can be realized by simple processing. Accordingly, it is possible to verify whether the notification command has been issued from the object stored rage described in the program header. For example, when the program issues a command to falsely notify control target loading for the purpose of illegally accessing the resources, it can be detected. Hence, it is possible to improve the safety of the program execution more.

The function access detection unit 12 calculates the stored address range of the real memory of the execution code of the control target function, and generates the stored address range as identification information. The resource access control unit 14 refers to the program counter of the process, and can determine access permission of the system call based on whether the stored address of the command code which has issued the system call is within the stored address range. Hence, based on the memory address range having the function execution code arranged therein, it is possible to verify whether the request of accessing the control target resources has been issued or not from the control target function.

The notification command may contain a memory address range of the execution code of the control target function, and the function access detection unit 12 may generate the memory address range obtained from the notification command as identification information. Accordingly, by hooking the notification command, the control target function loading can be detected to obtain the memory address range, and the control target function loading detection can be realized by simple processing. Thus, it is possible to reduce processing and installing costs of the access controller and the method.

The notification command may contain a temporary memory address range of the execution code of the control target function, and the function access detection unit 12 may obtain a real memory address range having an execution code arranged therein from the temporary memory address range, and generate the real address range as identification information. Accordingly, it is possible to calculate the real memory address range in which the function execution code is stored from the temporary memory address range contained in the communication command. Thus, the access controller and the method can be used even when the real memory address range cannot be derived during program execution code generation.

Presuming that the temporary memory address range is an address offset of the last execution code of the control target function from the execution code of the system call for function load notification, the function access detection unit 12 may obtain a real memory address range by adding the address offset to the memory address of the code being executed at the time of receiving the system call for function load notification. Thus, the real memory address range in which the function execution code is stored can be calculated from the temporary memory address range contained in the notification command. As a result, it is possible to use the access controller and the method even when the real memory address range cannot be derived during program execution code generation.

Other Embodiments

The present invention has been described according to the foregoing first to second embodiments. However, it should be understood that the description and drawings which partially constitute the present disclosure do not limit this invention. From this disclosure, various alternative embodiments, embodiments and operational technologies will become apparent to those skilled in the art.

For example, FIG. 2 shows the configuration where the access controller 10 is installed in the kernel 20 of the operating system. Needless to say, however, the access controller 10 may be installed in other places.

Furthermore, according to the embodiment, permission of the access request from the system call is determined. However, not limited to the system call, the present invention can be applied even in the case of access requests from other programs.

Various modifications will become possible for those skilled in the art after receiving the teachings of the present disclosure without departing from the scope thereof.

What is claimed is:

1. An access controller for controlling access to control target resources by a program, comprising:
    a function access detection unit implemented by a computer processor which detects loading of a control target function from the program and generates identification information necessary when a kernel specifies a system call for function load notification issued from the detected control target function;
    a function access control unit which obtains a function name of the control target function and information regarding a loading origin process of the control target function to determine permission of loading of the control target function based on function permission access control rules indicating whether a function is a control target function permitted to be loaded or not, the function permission access control rules including a conditional permission rule for permitting function loading under a condition of specific processing;
    an addition processing unit which executes predefined processing indicated by the conditional permission rule when loading of the control target function is permitted by the conditional permission rule; and
    a resource access control unit which obtains a system call to the control target resources from the program and determines permission of access of the system call based on the identification information and resource access control rules constituted of information of the control target resources, information of the program of an access request origin, the identification information, and a group of permitted operations, wherein
    the function access detection unit generates the identification information when the loading of the control target function is permitted by the function access control unit,
    the function access detection unit detects loading of the control target function based on receiving the system call for function load notification, the system call for function load notification including an address offset and a size of execution code of the control target function, and
    the function access detection unit generates the identification information by calculating a stored address range of execution code of the control target function based on the address offset and the size of the execution code.

2. The access controller of claim 1, wherein the function access control unit permits loading of the control target function when the addition processing unit executes the predefined processing.

3. The access controller of claim 1, wherein the resource access control unit determines permission of loading of the control target function based on the resource permission access control rules in addition to the identification information, and the resource access control rules further include rules to control access to the control target resources through a predetermined control target function.

4. The access controller of claim 1, wherein the function access detection unit detects loading of the control target function by obtaining a notification command disposed to notify loading of the control target function, and the notification command contains the identification information or information necessary for generating the identification information.

5. The access controller of claim 4, wherein the function access detection unit generates the identification information upon confirmation that the notification command has been issued from the control target function.

6. The access controller of claim 1, wherein
the function access detection unit loads a function name of the control target function on a stack when the control target function is loaded, removes the function name of the control target function from the stack when processing returns to the loading origin process of the control target function, and generates information stored in the stack as the identification information, and
the resource access control unit determines permission access of the system call based on the loading of the function name of the control target function on the stack.

7. The access controller of claim 1, wherein
the resource access control unit refers to a program counter of the program to determine permission of a resource access request based on whether a stored address of a command code which issued the resource access request is within the stored address range or not.

8. An access control method for controlling access to control target resources by a program, comprising:
detecting loading of a control target function from the program by a function access detection unit implemented by a computer processor;
generating identification information necessary when a kernel specifies a system call for function load notification issued from the detected control target function;
obtaining a function name of the control target function and information regarding a loading origin process of the control target function;
determining permission of loading of the control target function based on function permission access control rules indicating whether a function is a control target function permitted to be loaded or not, the function permission access control rules including a conditional permission rule for permitting function loading under a condition of specific processing;
executing predefined processing indicated by the conditional permission rule when loading of the control target function is permitted by the determining permission of loading of the control target function;
obtaining a system call to the control target resources from the program; and
determining permission of access of the system call based on the identification information and resource access control rules constituted of information of the control target resources, information of the program of an access request origin, the identification information, and a group of permitted operations, wherein
the function access detection unit generates the identification information when the loading of the control target function is permitted by the function access control unit,
the detecting loading of the control target function is based on receiving the system call for function load notification, the system call for function load notification including an address offset and a size of execution code of the control target function, and
the identification information is generated by calculating a stored address range of execution code of the control target function based on the address offset and the size of the execution code.

9. The access control method of claim 1, wherein
the function access detection unit
loads a function name of the control target function on a stack,
loads additional information of a function subordinate to the control target function on the stack, and
identifies that the control target function and the function subordinate to the control target function accessed the control target resources based on a function loading history contained on the stack.

10. The access control method of claim 1, wherein
the function access detection unit
loads a function name of the control target function on a stack,
loads additional information of a function subordinate to the control target function on the stack,
removes the additional information of the function subordinate to the control target function from the stack when processing returns to a loading origin of the function subordinate to the control target function, and
removes the function name of the control target function from the stack when processing returns to a loading origin process of the control target function.

11. The access control method of claim 10, wherein
the function access detection unit generates information stored on the stack as the identification information.

* * * * *